United States Patent
Chung et al.

(10) Patent No.: US 8,498,930 B2
(45) Date of Patent: Jul. 30, 2013

(54) SYSTEM AND METHOD FOR CREDIT FORECASTING

(75) Inventors: David Chung, Baltimore, MD (US); Thierry Marbach, Baltimore, MD (US)

(73) Assignee: CreditXpert, Inc., Baltimore, MD (US)

( * ) Notice: Subject to any disclaimer, the term of this patent is extended or adjusted under 35 U.S.C. 154(b) by 78 days.

(21) Appl. No.: 13/291,870

(22) Filed: Nov. 8, 2011

(65) Prior Publication Data

US 2012/0116951 A1 May 10, 2012

Related U.S. Application Data

(60) Provisional application No. 61/411,684, filed on Nov. 9, 2010.

(51) Int. Cl.
*G06Q 40/00* (2012.01)

(52) U.S. Cl.
USPC .............................. 705/38; 705/35

(58) Field of Classification Search
USPC ....................................... 705/35, 38
See application file for complete search history.

(56) References Cited

U.S. PATENT DOCUMENTS

| | | | |
|---|---|---|---|
| 7,020,631 B2 | 3/2006 | Freeman et al. | |
| 7,707,413 B2 | 4/2010 | Lunt et al. | |
| 7,797,725 B2 | 9/2010 | Lunt et al. | |
| 7,814,004 B2 | 10/2010 | Haggerty et al. | |
| 8,086,523 B1 * | 12/2011 | Palmer | 705/38 |
| 8,335,739 B1 * | 12/2012 | Bol et al. | 705/38 |
| 2001/0029477 A1 | 10/2001 | Freeman et al. | |
| 2006/0242049 A1 | 10/2006 | Haggerty et al. | |
| 2006/0242051 A1 | 10/2006 | Haggerty et al. | |
| 2006/0271470 A1 | 11/2006 | McNamar et al. | |
| 2007/0226093 A1 | 9/2007 | Chan et al. | |
| 2008/0222015 A1 | 9/2008 | Megdal et al. | |
| 2008/0222027 A1 | 9/2008 | Megdal et al. | |
| 2008/0249788 A1 | 10/2008 | Heller et al. | |
| 2008/0294547 A1 | 11/2008 | Zigman | |
| 2009/0030829 A1 | 1/2009 | Chatter et al. | |
| 2009/0063330 A1 | 3/2009 | Cerise et al. | |
| 2009/0076972 A1 | 3/2009 | Witchel et al. | |
| 2009/0265281 A1 | 10/2009 | Cohen et al. | |
| 2009/0327120 A1 | 12/2009 | Eze et al. | |
| 2010/0169126 A1 | 7/2010 | Chatter et al. | |
| 2010/0223168 A1 | 9/2010 | Haggerty et al. | |
| 2010/0228658 A1 * | 9/2010 | Ketelsen et al. | 705/35 |

OTHER PUBLICATIONS

Monitoring the Household Sector with Aggregate Credit Bureau Data Business Economics o Jan. 2000.*
Which credit reports matter? Tytler, Steve. The Herald [Everett, Wash] Jun. 15, 2008.*

* cited by examiner

*Primary Examiner* — William Rankins
(74) *Attorney, Agent, or Firm* — Whiteford, Taylor & Preston LLP

(57) ABSTRACT

Disclosed is a system and method for the automated summarizing and reporting of key credit data elements of a consumer's multiple credit reports into an electronic, condensed, human-readable summary report including those key credit data elements most of interest to a loan originator. The generated electronic summary document displays the consumer's current credit mid-score, a credit mid-score forecast 30 days in the future, a mid-score projection based upon increases in the consumer's revolving debt, and an indication of the presence of negative credit information in the consumer's native credit reports.

18 Claims, 5 Drawing Sheets

SYSTEM AND METHOD FOR CREDIT FORECASTING

CROSS REFERENCE TO RELATED APPLICATION

This application is based upon and claims priority from co-pending U.S. Provisional Patent Application Ser. No. 61/411,684 entitled "System and Method for Credit Forecasting," filed with the U.S. Patent and Trademark Office on Nov. 9, 2010 by the inventors herein, the specification of which is incorporated herein by reference.

FIELD OF THE INVENTION

This invention relates generally to credit forecasting, and more particularly to a system and method for the automated summarizing and reporting of key credit data elements into a human-readable summary report.

BACKGROUND OF THE INVENTION

Mortgages may be underwritten by evaluating a mortgage applicant's credit, collateral, and capacity to pay. A preliminary evaluation of credit is typically performed by mortgage originators (that is, loan representatives for mortgage brokers and mortgage lenders) prior to submitting the loan application to underwriting. This evaluation is typically done by examining a tri-bureau merged credit report, which is created for the mortgage originator by a credit reporting agency by merging the consumer files provided by the three dominant credit bureaus: Experian, TransUnion, and Equifax.

Nearly all mortgage applications list either a single applicant, or two applicants of which one is the primary applicant and the other is the co-applicant. In the case of two applicants, their credit is typically evaluated separately.

Nearly all mortgages are underwritten using credit scores. The credit score used for underwriting each applicant is the mid-score; that is, the median among the three credit scores computed from the three credit bureaus.

In addition to the mid-score, other credit information generally used in underwriting consists of negative payment history on mortgages, the presence of unpaid collection accounts on public records, and the presence of accounts in credit counseling.

Capacity to pay in mortgage underwriting is typically evaluated using debt-to-income ratios. By convention, underwriters do not consider installment loans with 10 months of payments or less remaining and authorized user accounts in the debt-to-income ratios.

Mortgage originators often are required by lenders to obtain a new credit report after the initial evaluation and prior to closing on the mortgage, so that the period between underwriting and closing is not so long such that the information could have changed significantly. As a result, mortgage originators are concerned not just about the mid-score as it is when they obtain a credit report, but also about the potential for it to drop prior to closing the loan.

Authorized user accounts are included in the credit score calculation. They can be easily removed from the credit report and score calculation if they are having a negative effect on the credit score.

Mortgage lenders will generally refuse to underwrite an application where any of the accounts on the credit report is in dispute.

Mortgage originators also find it useful to know whether their applicants have been shopping around for mortgages prior to coming to them. This can be determined from the credit report by the presence of credit inquiries from other mortgage originators.

In addition to credit information, consumer credit files can also contain alerts of various kinds of dangers to the underwriting process, including possible fraud and presence on the OFAC prohibited parties list. Mortgage originators need to pay attention to these alerts for legal and policy compliance.

Unfortunately, all of the foregoing disparate factors can have an impact on the mortgage originator's evaluation of an applicant's credit. However, trying to keep track of this data can be a significant challenge for the mortgage originator, particularly given the varied nature and distributed character of such data. It would therefore be advantageous to provide a system and method capable of analyzing, condensing, and reporting the most relevant portions of data that would affect the mortgage originator's evaluation into a single, human-readable report.

SUMMARY OF THE INVENTION

Disclosed is a system and method for generating a one-page capsule of key elements that a mortgage originator or other loan officer should be made aware of when considering an applicant's credit. Prior to the system and method described herein, mortgage originators needed to dig through the tri-bureau merged credit report (often running 10 pages or more of densely packed information) to determine whether the important pieces of information are present. Using the system and method described herein, the mortgage originator can determine at a glance important information that they need to know about the applicants' credit reports.

The system and method described herein automatically generate a presentation for mortgage credit reports that gives mortgage originators an instant snapshot of an applicant's creditworthiness. The system and method combine credit forecasts and key indicators needed to follow industry best practices into a simple, elegant presentation that is delivered automatically with every credit report with no additional log-ins or clicks. This allows mortgage originators to instantly size up their loan applicants to spot any critical issues, all without digging through the actual credit report.

Each page of the report generated by the system and method described herein preferably includes an easy-to-scan summary of three components: a forecast of the applicant's mid-score in 30 days, enabling the originator to immediately be aware of potential problems at closing; a mid-score risk component that alerts the originator if nominal increases in the applicant's revolving balance would put the mid-score at risk of dropping; and key indicators from the credit report that may require the mortgage originator's attention.

BRIEF DESCRIPTION OF THE DRAWINGS

The numerous advantages of the present invention may be better understood by those skilled in the art by reference to the accompanying figures in which.

DETAILED DESCRIPTION OF THE PREFERRED EMBODIMENTS

Figure 1:
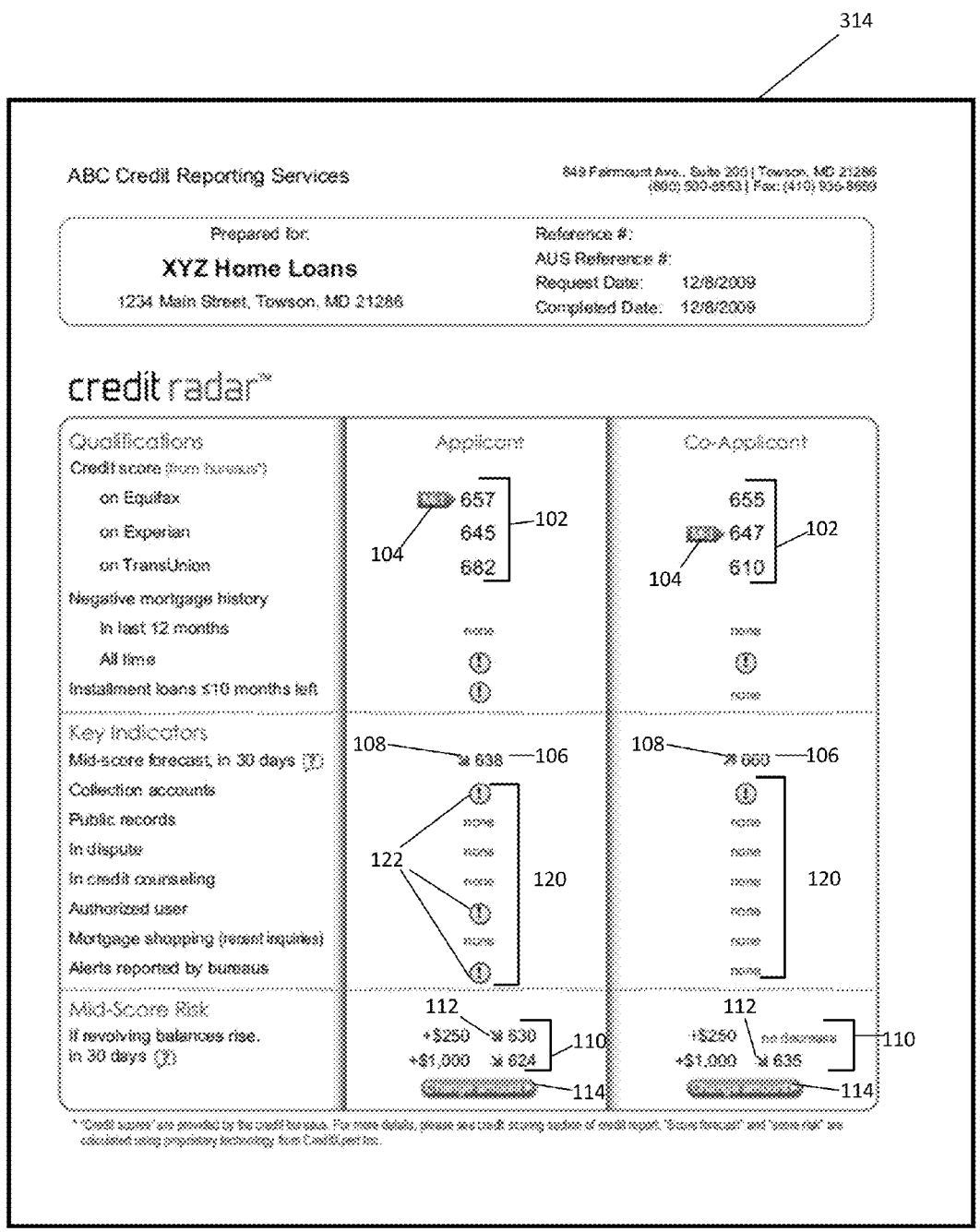
FIG. 1 is an exemplary view of an electronic, one-page summary report of key applicant credit data according to certain aspects of an embodiment of the invention.

The following description is of a particular embodiment of the invention, set out to enable one to practice an implementation of the invention, and is not intended to limit the preferred embodiment, but to serve as a particular example thereof. Those skilled in the art should appreciate that they may readily use the conception and specific embodiments disclosed as a basis for modifying or designing other methods and systems for carrying out the same purposes of the present invention. Those skilled in the art should also realize that such equivalent assemblies do not depart from the spirit and scope of the invention in its broadest form.

In accordance with certain aspects of a particularly preferred embodiment, the system and method set forth herein allow a mortgage originator to immediately identify which loan programs the applicants may qualify for, if any, because the system and method described herein displays the credit scores, marks the mid-score, and provides flags for negative mortgage payment history, collection accounts, and public records. The mortgage originator also has the ability to immediately identify hurdles to completing the closing of the loan, because the system and method described herein provides flags for accounts in credit counseling, recent mortgage shopping by the applicants, authorized user accounts, accounts in dispute, and alerts provided by the credit bureaus. The mortgage originator further has the ability to immediately see if the mid-score is likely to drop such that the applicants may no longer qualify for their loan programs, because the system and method described herein displays the forecasted mid-score if the applicants do nothing but pay their bills on time, and the forecasted mid-scores if the applicants increase their revolving balances by pre-specified dollar amounts. Moreover, the mortgage originator has the further ability to change the revolving balance used in the mid-score risk evaluation, in case the applicant reveals a specific revolving balance increase that has already occurred but has not yet been reflected on the credit report.

In accordance with certain aspects of a particularly preferred embodiment of the invention, a system and method are provided offering a new product that may be useful for the mortgage broker market with additional application in the mortgage lender market. That system and method, as detailed further below, provide functionality that presents key pieces of aggregated information from a credit report to the mortgage broker preferably as a cover page to the credit report, to help the broker complete their job in an expedited and reliable manner. The system and method also provide functionality to forecast the impact of 30 days of aging on the consumer's mid-score, and to provide an accurate and reliable prediction for the risk of a decrease in the consumer's mid-score due to increases in revolving balances. By default, the forecasts may be for balance increases of preferably $250 and $1,000, although other amounts may be designated to suit the preferences of a particular mortgage originator. The report is configured to communicate these ideas in an easy-to-understand manner on a single page. The system and method may optionally provide a comprehensive deployment guide and testing documentation to assist in successful implementation of the software by client-hosts.

The system and method described herein may be provided to mortgage originators from a supplier, optionally through a hosting partner, in which case the supplier may provide the software engine and the design for the user interface, while the hosting partner codes the interface and integrates the software engine to their platform.

Figure 2:
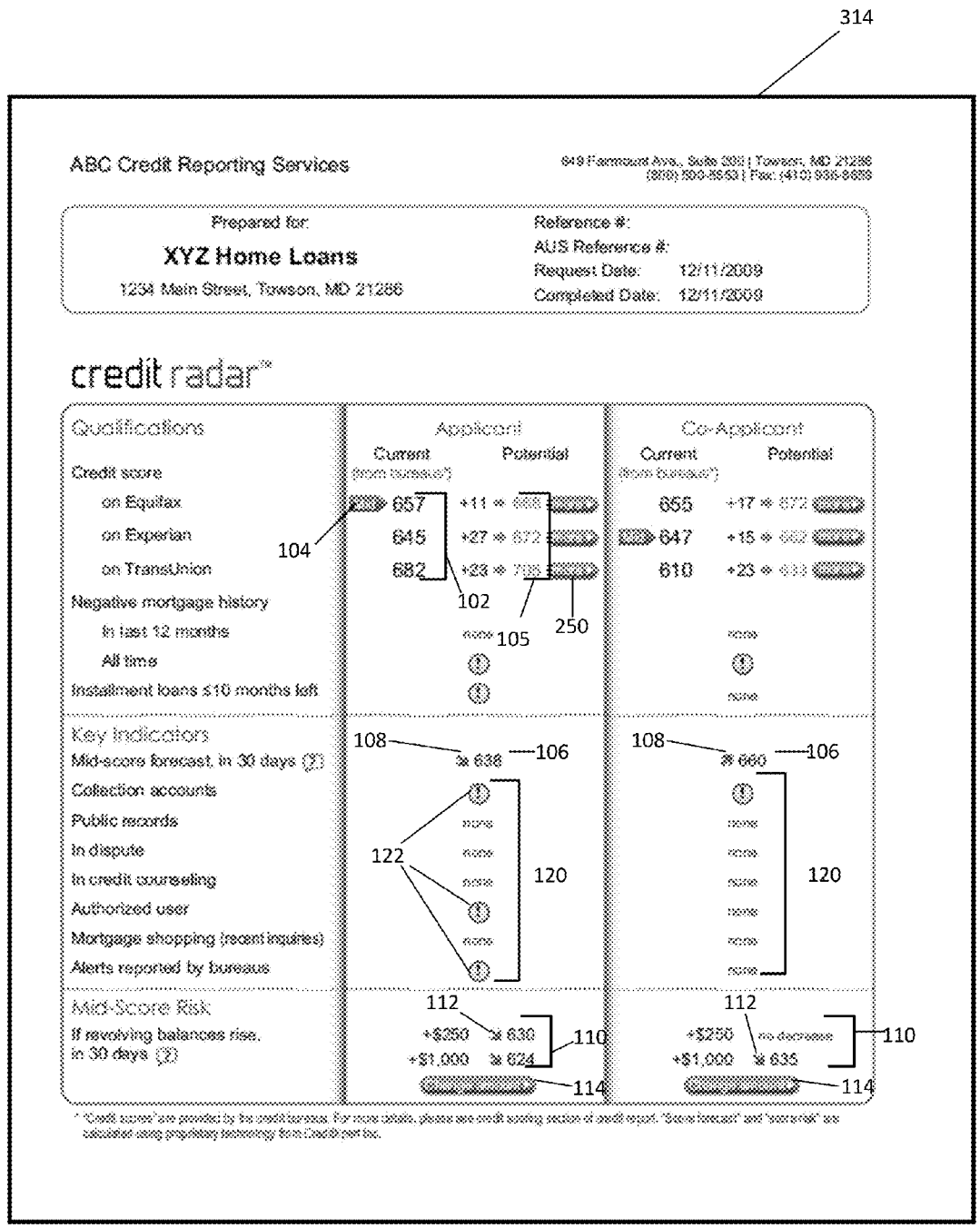
FIG. 2 is an exemplary view of a second electronic, one-page summary report of key applicant credit data according to certain aspects of an embodiment of the invention.

In order to ensure that the indicators on the report generated by the system and method described herein do not conflict with the tri-merged credit report, the values of the underlying variables from the tri-merged credit report are preferably computed according to the specifications detailed in the following table. These values are preferably submitted when calling the software engine implementing the system and method described herein. Exemplary representations of reports that may be generated by the system and method described herein are shown in FIGS. 1 and 2.

| Type of information | Information needed for System | Calculation Details |
|---|---|---|
| Mortgage Trade Payment History | The inputs include the count of all trades that have ever been late and are identified as mortgages on the merged credit report and the count of all trades that have been late in the last 12 months and are identified as mortgages on the merged credit report. Note: For this purpose, "late" preferably includes all negative payment statuses, including: foreclosed, foreclosure started, short sale, or deed in lieu; charged off; placed for collection; settled for less than the full balance; and included in or discharged in bankruptcy. | Input provided includes all trades identified as mortgages on the merged credit report. Each mortgage preferably requires a list of late dates (if any), and its late counters. Note: For this purpose, "late" preferably includes all negative payment statuses, including: foreclosed, foreclosure started, short sale, or deed in lieu; charged off; placed for collection; settled for less than the full balance; and included in or discharged in bankruptcy. The list of late dates preferably includes the number of negative entries in the payment grid on the merged credit report (zero if there are no lates in the payment grid), and an entry for each negative entry in the payment grid that includes the corresponding date and payment status. Late counters are simply the counters of 30-day, 60-day, and 90-day lates from the merged credit report. |
| Installment Loans | The input includes the count of all trades that are identified as installment on the merged credit report, are not leases, are not late as of | Input provided includes all trades identified as installment on the merged credit report that are not paid off. Each installment trade preferably requires an indicator of whether the account is a lease, an |

| Type of information | Information needed for System | Calculation Details |
|---|---|---|
| | the date of the credit report, are not paid off, and have 10 or fewer payments remaining. To determine the number of payments remaining: Monthly payments made = Date of the credit report − Date the account was opened (in months) Payments remaining = Terms in months − Monthly payments made | indicator of whether the account is late as of the date of the credit report, and the information needed to determine number of months of payments remaining. If the merged credit report provides detailed account type information that identifies leases, then that information should be used to set the indicator of whether the account is a lease. Otherwise, leases can be identified as follows: Equifax: Narrative Code of BT, DN, EB, IB, IC, ID, IG, JQ, or KE TransUnion: Loan Type Code of AL or LE, or Remarks Code of PLL Experian: Type Code of 13 or 3A, or Special Comment Code of 76 If an account is listed as a lease on any bureau, the indicator of whether the account is a lease should be set to yes. The information needed to determine the number of months of payments remaining includes the date the account was opened and the terms in months, as displayed in the merged credit report. |
| Collection Agency Accounts | The input includes the count of all tradelines that are identified as collection agency accounts on the merged credit report. | Input provided includes all tradelines identified as collection agency accounts on the merged credit report. |
| Public Records | The input includes the count of all tradelines that are identified as public records on the merged credit report. | Input provided includes all tradelines identified as public records on the merged credit report. |
| Accounts in Credit Counseling | The input includes the count of all trades identified as in credit counseling on the merged credit report (excluding paid off accounts), or if no such identification is made then all trades identified as in credit counseling according to the specification provided in the details column. | Input provided includes all trades identified as in credit counseling on the merged credit report (excluding paid off accounts), or if no such identification is made then all trades identified as in credit counseling according to the specification below. If the merged credit report identifies accounts currently in credit counseling, then that information should be used to create the list of accounts for this input section. Otherwise, accounts currently in credit counseling can be identified as follows: Equifax: Status Code = F, or one of the Narrative Codes is BX or GC; and Balance > 0 TransUnion: Loan Type Code = DS, or Remarks Code = MCC; and Balance > 0 Experian: Type Code = 34, or Special Comment Code = 11; and Balance > 0 If an account is in credit counseling on any bureau, it should be included. |
| Accounts in Dispute | The input includes the count of all trades and collection agency accounts identified as in dispute on the merged credit report, or if no such identification is made then all trades and collection agency accounts identified as in dispute according to the specification in the details column. | Input provided includes all trades and collection agency accounts identified as in dispute on the merged credit report, or if no such identification is made then all trades and collection agency accounts identified as in dispute according to the specification below. If the merged credit report identifies accounts in dispute, then that information should be used to create the list of accounts for this input section. Otherwise, accounts in dispute can be identified as follows: Equifax: Status Code of S, Collection Status Code of S, or Narrative Code of AF, AG, AL, BB, BH, BV, DE, EI, EJ, FF, FG, FO, FP, FQ, FW, GE, IP, or IQ TransUnion: Remarks Code of AID, BCD, BKD, CAD, CDC, CDL, CDR, CDT, CFD, CRC, CTC, WCD, or WPD, or Collection Segment (CL01) Verification Indicator of T Experian: Special Comment Code of 14, 78, 83, or 88. If the account is in dispute on any bureau, it should be included. |
| Authorized User Accounts | The input includes the count of all trades identified as authorized user accounts on | Input provided includes all trades identified as authorized user accounts on the merged credit report, or if no such identification is made then |

-continued

| Type of information | Information needed for System | Calculation Details |
|---|---|---|
| | the merged credit report, or if no such identification is made then all trades with an ECOA Code of A. | all trades with an ECOA Code of A. |
| Recent Mortgage Inquiries | The input includes the count of all inquiries with dates in the last 60 days identified as mortgage inquiries on the merged credit report. | Input provided includes all inquiries identified as mortgage inquiries on the merged credit report.<br>Each mortgage inquiry preferably requires the date of the inquiry.<br>If the bureau is TransUnion and there exists a mortgage inquiry with the date the same as the date of the TransUnion credit file, the count of inquiries should be reduced by one. This is to scrub the "current" inquiry from generating an indicator. |
| Alerts | The input includes the count of all credit bureau alerts listed on the merged credit report.<br>Credit bureau alerts that should be included are positive indications of fraud, active duty military status, death, and OFAC match, as well as indication that the submitted SSN is not a match to the credit file. | Input provided includes indicators for each type of credit bureau alert listed on the merged credit report. |

Figure 3:
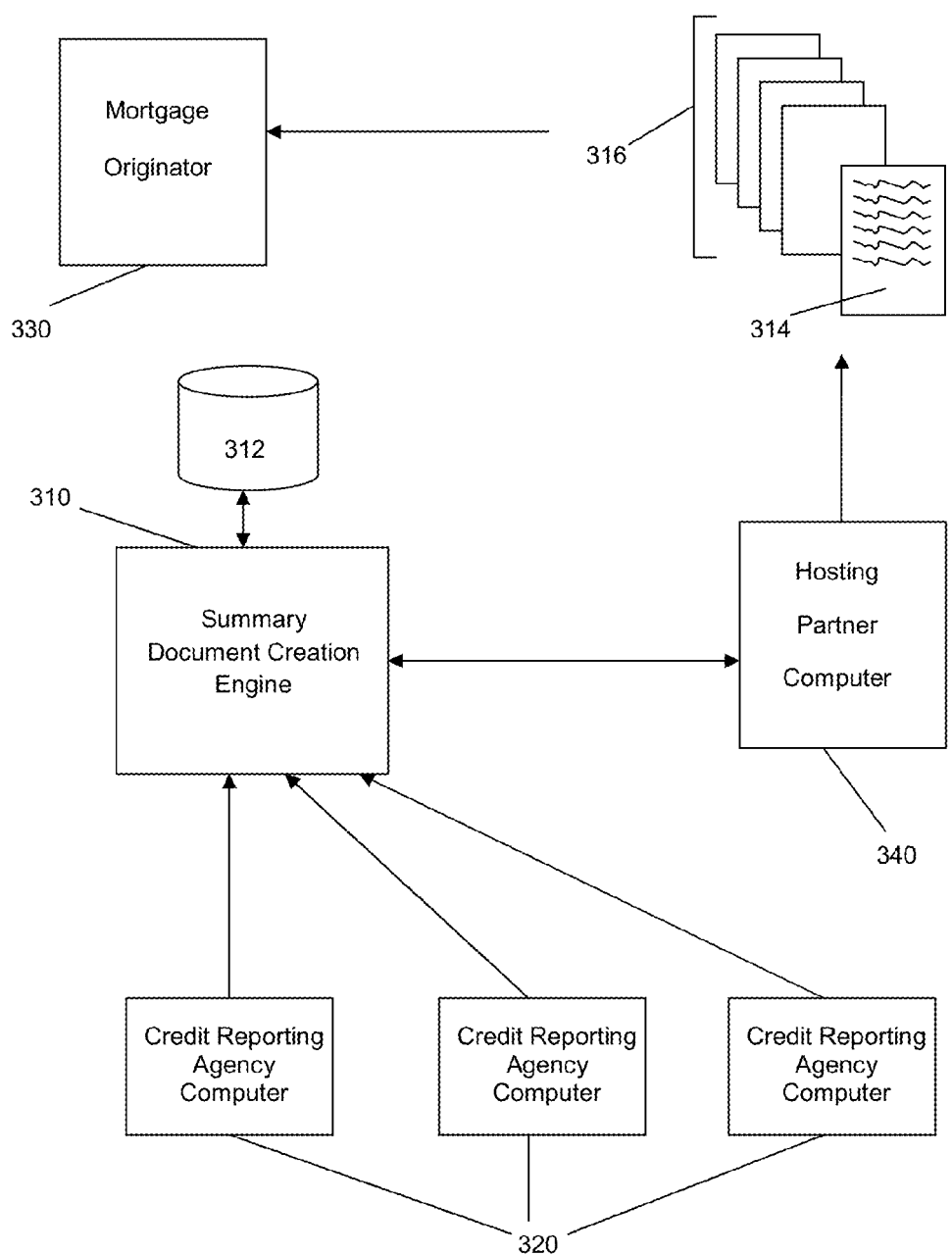
FIG. 3 is a schematic representation of a system for credit forecasting according to certain aspects of an embodiment of the invention.

FIG. 3 provides a schematic view of a system suitable for implementing a credit forecasting system in accordance with certain features of an embodiment of the invention. A summary document creation engine 310 is provided, and is preferably in data communication with an electronic data storage device 312 that may store applicant financial and credit history data. Summary document creation engine 310 also includes a processing module capable of receiving data from credit bureau server computers 320, processing that data to produce the outputs described below, and outputting that data to an electronic form viewable as a single-page document 314 on the computer of an end user 330, such as the computer system of a mortgage originator. Preferably, the electronic, single-page summary document 314 is transmitted to end user computer 330 along with an electronic copy of the applicant's combined credit report 316, which typically is multiple pages of highly condensed financial information. Optionally, the data processed by summary document creation engine 310 may be electronically transmitted to a hosting partner computer 340, which as mentioned above may integrate the outputs discussed below into the hosting partner's user interface, thus presenting the summary document 314 in their own branded environment. In this arrangement, summary document creation engine 310 and hosting partner computer 340 may be implemented on separate computer servers in communication with one another across a communications network, such as a wide area network such as the Internet. Alternatively, summary document creation engine 310 may be implemented as a software code-enabled module executable on the hosting partner computer 340. In any event, mortgage originator 330 and credit bureau server computers 320 are likewise configured to communicate with summary document creation engine 310 and hosting partner computer 340 again across a wide area network such as the Internet.

For hosting partner computers 340 that do not have the ability to provide certain counts for displaying indicators of the method described herein, the summary document creation engine 310 can compute any count that the host cannot calculate but would like the system to output. This functionality can be called by the hosting partner computer 340 for any subset of the indicators, as part of the request submitted to the summary document creation engine 310. The summary document creation engine 310 computes the count directly from the raw consumer files from each credit bureau computer 320 so that the output will preferably be identical to the situation in which the count is provided by the hosting partner computer 340.

Figure 4:
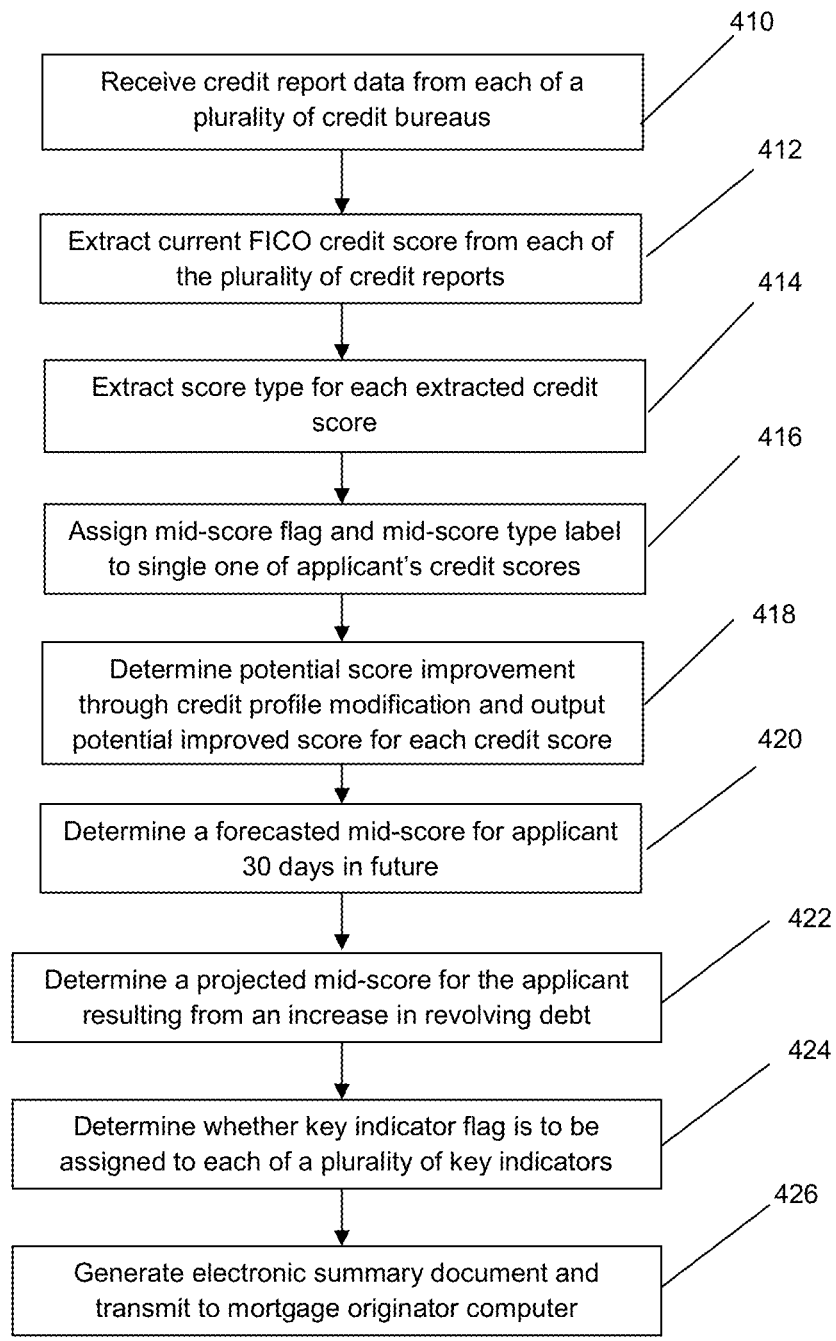
FIG. 4 if a flowchart representation of a method of credit forecasting according to certain aspects of an embodiment of the invention.

With reference to the flow chart of FIG. 4, the summary document creation engine 310 generates a number of outputs from the data received at step 410 from the credit bureau computers 320, which data is then processed to generate a summary report 314 detailing the key factors that a mortgage originator should review in determining whether or not to grant a mortgage loan.

One such output is the current score of a particular consumer that is the intended subject of the summary report. At step 412, such current score is parsed from the raw credit data received from the credit reporting agencies. One current score value is output for each applicant for each of the following bureaus: Equifax, Experian and TransUnion (even if the profile from a particular bureau is missing, in which case a special value is output). More particularly, a single score for each of the bureaus (Equifax, Experian and TransUnion) is output (even when the profile for a particular bureau is missing). This score is obtained from the respective score segments for each of the credit files.

The score output for each bureau may take one of the following values: actual bureau score (as extracted from the raw credit profile); none; unknown score; or not scorable. The logic employed by the summary document creation engine 310 in order to populate the original scores for each bureau is as follows. First, if the score segment exists and the score version is supported by the system's score forecasting models, the output is the actual score. This is a valid score. Next, if the profile from a particular bureau is missing, the software will output "none" for that bureau's score. This is an invalid score. Next, if no score segment with a recognized score is present, the software outputs "none." This is an invalid score. Next, if a score segment is present with a recognized score but is not one of the valid types, the software will output "unknown score." This is an invalid score. Next, if the score segment contains a code that indicates the credit file is unscorable, the software will output "not scorable." This is a valid score. In the case of multiple Equifax files for the same applicant, the first scorable file will be chosen. Also, in case of a TransUnion profile with multiple score segments, the first one is used. This is to account for a situation in which there are two or more scores returned from TransUnion.

FIGS. 1 and 2 show the current score 102 presented on electronic form of single-page document 314.

Another output of the summary document creation engine is a score type. At step 414, the summary document creation engine 310 parses the score type from the raw credit data received from the credit reporting agencies, and stores this value for further use by the system as discussed in greater detail below. This is the score type of the Original score. One output is generated for each applicant for each of the following bureaus: Equifax, Experian and TransUnion (even if the profile from a particular bureau is missing, in which case a special value is output). More particularly, when a profile is missing or a profile has no score segment, a value of "N/A" is preferably returned for the score type.

The next output of the summary document creation engine relates to assignment of a mid-score flag to a single one of the plurality of an applicant's credit scores received from the credit reporting agencies. At step 416, a mid-score flag for the consumer's current credit scores is produced by the summary document creation engine, and provides the information to the developer to place an arrow (104 of FIGS. 1 and 2) on a particular one of the plurality of scores for the consumer (i.e., one among the three original credit scores) in order to draw the attention of the human reviewer (i.e., the user of mortgage originator computer 330) of the summary report to the particular mid-score. Likewise, the summary document creation engine generates a mid-score type label, informing the hosting partner computer what type of score the mid-score flag is particularly highlighting. The possible values for such mid-score type labels preferably include "middle" and "low." In the event that the mid-score flag is missing, the mid-score type label is also absent.

Further, the mid-score flag is present for only one credit reporting bureau, and allows the host partner's developer to display an arrow indicating the mid-score on the original score from that bureau. Likewise, as mentioned above, the summary document creation engine produces the mid-score type label that will provide the text within the arrow that will indicate the type of the mid-score (i.e., middle or low).

The logic employed by the summary document creation engine to pick the mid-score bureau and the mid-score type label is provided below. As explained above, the original mid-score is the current score from the bureau that is assigned the mid-score flag.

First, if there are three valid current scores, the original mid-score is calculated as follows. If there are no unscorables, the middle scoring bureau is assigned the mid-score flag, and the mid-score type label is "Mid." Next, if there is one unscorable, then the lowest scoring bureau is assigned the mid-score flag, and the mid-score type label is "Mid." Next, if there are two unscorables, then the remaining score is assigned the mid-score flag, and the mid-score type label is "Mid." Further, if there are three unscorables, no bureau is assigned the mid-score flag, and the mid-score type label is not output. Last, in the case of a tie (excluding unscorables), one of the bureaus with tied (repeated) scores is the mid-score and the tie will preferably be broken in favor of alphabetical order of bureau names: Equifax, Experian, TransUnion. In this case, mid-score type label is "Mid."

Next, if there are two valid current scores, the mid-score is calculated as follows. If there are no unscorables, the lowest scoring bureau is assigned the mid-score flag, and the mid-score type label is "Low." Next, if there is one unscorable, then the lone scored bureau is assigned the mid-score flag, and the mid-score type label is "Low." Next, if there are two unscorables, no bureau is assigned the mid-score flag, and the mid-score type label is not output. Last, in the case of a tie (excluding unscorables), one of the bureaus with tied (repeated) scores is the mid-score and the tie will be broken in favor of the alphabetical order of bureau names: Equifax, Experian, Transunion. In this case, the mid-score type label is "Low."

Next, if there is one valid current score, no mid-score flag is generated, and the mid-score type label is not output.

Likewise, if there are no valid current scores, again no mid-score flag is generated, and the mid-score type label is not output.

The next output of the summary document creation engine is optional and relates to the potential improvement in the consumer's credit score, and more particularly to credit score improvement opportunities, which opportunities may be identified through execution of commercially available computer software for determining credit profile modifications that may improve an individual's credit score, such as the software application CREDIT ASSURE™, which is commercially available from the assignee of the instant application. At step 418, one output may optionally be generated for each bureau and applicant (even when the profile for the bureau is missing, in which case it takes a value of blank). The summary document creation engine may then calculate the consumer's potential score as their current score plus their potential score improvement. Again, one output may optionally be generated for each bureau and applicant. FIG. 2 shows an exemplary electronic form of single page document 314 for which a potential score improvement 105 has been calculated.

A consumer's potential score improvement is preferably output only when a computer generated determination of credit profile modifications that may improve an individual's credit score, such as that which is available from CREDIT ASSURE™ from the assignee of the instant invention, is also requested in the run. If CREDIT ASSURE™ is requested in the run, the summary document creation engine 310 will preferably output the current appropriate XML output fragment, and may take one of the following values: +0, blank, or signed integer. The logic employed by the summary document creation engine for populating the potential score improvement for each bureau is as follows. First, the process proceeds only when the current score is valid and scorable. If the current score for any bureau is "not scorable," "none," or "unknown score," then potential score improvement for that bureau is blank and the "More" button 250 of FIG. 2 is not shown. Likewise, if the potential score is unscorable and the current score is scorable, then the potential score improvement=+0 and the "More" button 250 of FIG. 2 is not shown.

The consumer's potential score 105 is thus their projected score as if the actions recommended by CREDIT ASSURE™ were carried out by the consumer and the credit bureau re-reported the relevant information. Again, one potential score will optionally be output for each bureau and applicant (regardless of the number of profiles, even when a profile for that bureau is missing). If the potential score improvement is blank, then the potential score will also be blank; otherwise, the potential score equals the consumer's current score plus their potential score improvement.

Next, at step 420, the summary document creation engine 310 outputs a forecasted mid-score for the consumer 30 days in the future (a single value is generated for each consumer applicant), showing the effect of the passage of time for the applicant's mid-score. FIGS. 1 and 2 show an exemplary electronic form of a single page document 314 for which a 30 day forecasted mid-score 106 has been calculated. A mid-score forecast label is also produced that describes the mid-score forecast type. This descriptive label is based on the mid-score forecast type of the primary applicant, such that only one such mid-score forecast label is produced (i.e., even if it is a joint applicant, only a single label is produced). The value of the mid-score forecast label is thus based on the primary applicant in the request. The summary document creation engine 310 outputs the forecasted mid-score 106 for the applicant after aging all provided credit files for preferably one month. The summary document creation engine 310 also preferably provides a direction indicator that will allow the presentation layer to show a graphic 108 comprising an upward arrow (UP), a downward arrow (DOWN), or no arrow (NEUTRAL) associated with the presented forecasted mid-score.

The general method for calculating the forecasted mid-score, arrow indicator, and mid-score forecast label is as follows. For each profile with a valid credit score, the summary document creation engine 310 applies a scenario to age the profile by one month and calculates the forecast delta as the forecasted score after aging minus the current score. Then, the forecast delta is added to each valid current score to calculate the 30 day forecasted score. If the current score is unscorable, the forecast delta equals 0, and the forecasted credit score equals unscorable.

More particularly, the logic employed by the summary document creation engine 310 to calculate the forecasted mid-score and text label is as follows.

First, if there are three valid current scores, then the forecasted mid-score is calculated as follows. If there are no unscorables, the forecasted mid-score is the median of the forecasted scores, and the mid-score forecast label output is "Mid-score forecast, in 30 days." Next, if there is one unscorable, then the forecasted mid-score is the lowest forecasted score, and the mid-score forecast label output is "Mid-score forecast, in 30 days." Next, if there are two unscorables, then the forecasted mid-score is the only forecasted score, and the mid-score forecast label output is "Mid-score forecast, in 30 days." Next, if there are three unscorables, then the forecasted mid-score is "NA," and the mid-score forecast label output is "Mid-score forecast, in 30 days." Further, in case of a tie in the forecasted scores (excluding unscorables), the tied forecasted score is the forecasted mid-score, and the mid-score forecast label output is "Mid-score forecast, in 30 days." Last, if on any bureau the current score is scorable but the software was unable to return a forecast, then the forecast mid-score is "insufficient data," and the mid-score forecast label output is "Mid-score forecast, in 30 days."

Second, if there are two valid current scores, then the forecasted mid-score is calculated as follows. If there are no unscorables, the lowest forecast score is output, and the text label output is "Low-score forecast, in 30 days." Next, if there is one unscorable, then the lone forecast score is output, and the text label output is "Low-score forecast, in 30 days." Next, if there are two unscorables, then "NA" is output for the score forecast, and the text label output is "Low-score forecast, in 30 days." Further, in case of a tie in the forecast scores (excluding unscorables), the repeated score is the forecast, and the text label output is "Low-score forecast, in 30 days." Last, if on any bureau the current score is scorable but the software was unable to return a forecast, then the forecast mid-score is "insufficient data," and the text label output is "Low-score forecast, in 30 days."

Third, if there is one valid current score, then the resulting mid-score is calculated as follows. If there are no unscorables, the lone forecast score is output, and the text label output is "Score forecast, in 30 days." If there is one unscorable, then "NA" is output for the score, and the text label output is "Score forecast, in 30 days." If on any bureau the current score is scorable but the software was unable to return a forecast, then the forecast mid-score is "insufficient data," and the text label output is "Score forecast, in 30 days."

Finally, if there are no valid current scores, then the mid-score forecast is "N/A," and the text label output is "Score forecast, in 30 days."

Likewise, the logic employed by the summary document creation engine 310 in order to calculate the arrow indicator 108 is as follows. First, if the forecasted mid-score equals "insufficient data" or "N/A," then the arrow indicator 108 is NEUTRAL. Second, if the forecasted mid-score is greater than the original mid-score, then the arrow indicator 108 is UP. Third, if the forecasted mid-score is less than the original mid-score, then the arrow indicator 108 is DOWN. Last, if the forecasted mid-score equals the original mid-score, then the arrow indicator 108 is NEUTRAL.

Further, the logic employed by the summary document creation engine 310 in order to age the profile by one month is as follows. Generally, the engine 310 creates a projected raw credit file for each bureau and applicant and scores that projected credit file to obtain the forecasted score 106. The projected raw credit profile incorporates the following assumptions: (i) only accounts that have been updated within the last three months are aged; (ii) all dates that change monthly are advanced by one month; (iii) installment loan balances are reduced by the principal amount of their monthly payments, unless the account is in a terminal derogatory status; (iv) revolving and charge card balances remain the same; (v) payment statuses remain the same on all accounts; and (vi) negative information is removed according to FCRA time limits, if needed.

Next, at step 422, the summary document creation engine 310 outputs a projected mid-score for the consumer resulting from an increase in that consumer applicant's revolving debt. The summary document creation engine 310 produces a mid-score risk, and more particularly a projection for increasing the revolving balances of the consumer applicant by some fixed amount, such as by way of non-limiting example increases of both $250 and $1000, with each balance increase amount producing one mid-score risk per applicant. FIGS. 1 and 2 show an exemplary electronic form of a single page document 314 for which projected mid-scores 110 have been calculated based on hypothetical increases of the applicant's revolving debt. Likewise, the summary document creation engine 310 produces a mid-score risk label that describes the mid-score risk type. This descriptive label is based on the mid-score risk type of the primary applicant, such that one is produced per run (i.e., even if it is a joint applicant, a single label is produced). The summary document creation engine 310 preferably outputs the scenario for the mid-score for the consumer applicant after applying the scenario to all credit files received from the credit reporting agencies.

The summary document creation engine 310 also provides a direction indicator that will allow the presentation layer to show a graphic 112 comprising an upward arrow (UP) (which in practice should never happen), a downward arrow (DOWN), or no arrow (NEUTRAL) associated with the presented mid-score.

Moreover, the summary document creation engine 310 provides a text label (for the section header) which changes depending on whether the mid-score is the middle score, the low score, or a single score. Such text labels thus preferably include "Mid-Score Risk," "Low-Score Risk," and "Score Risk," respectively.

Further, the summary document creation engine outputs a flag for the host's developer to determine whether to show the "Change amount" button 114 reflected in FIGS. 1 and 2.

The method for calculating the scenario mid-score (for a single scenario with balance increase amount $X), arrow indicator and text label is as follows. For each profile with a valid current score, the summary document creation engine 310 applies the scenario to increase revolving balances by $X (for example, $250 or $1,000). If the scenario results in an error, then apply the "make payments for 1 month" scenario (keep the final score from this aging scenario), and flag the profile as an "error." If the scenario returns a warning of partial success because the total available credit was not able to absorb the full balance increase, then flag the profile as an error (but keep the final score from the balance increase scenario). Next, calculate the scenario delta as the score after scenario minus the current score. Next, add the scenario delta to each valid current score to calculate the scenario score. If the current score is unscorable, then the scenario delta equals 0, and the scenario score equals unscorable.

The logic employed by the summary document creation engine 310 to calculate the scenario mid-score and the text label is as follows.

First, if there are three valid current scores, then the scenario mid-score is calculated as follows. If all profiles have the error flag, the scenario mid-score is "insufficient credit," and the text label output is "Mid-score Risk." Next, if there are no unscorables, then the scenario mid-score is the middle scenario score, and the text label output is "Mid-score Risk." Next, if there is one unscorable, then the scenario mid-score is the lowest scenario score, and the text label output is "Mid-score Risk." Next, if there are two unscorables, then the scenario mid-score is the only scenario score, and the text label output is "Mid-score Risk." Next, if there are three unscorables, then the scenario mid-score is "N/A," and the text label output is "Mid-score Risk." Further, in case of a tie in the scenario scores (excluding unscorables), the scenario mid-score is the repeated scores, and the text label output is "Mid-score Risk." Last, if on any bureau the current score is scorable but the software was unable to return a forecast, then the scenario mid-score is "insufficient data," and the text label output is "Mid-score Risk."

Second, if there are two valid current scores, then the scenario mid-score is calculated as follows. If both the profiles have the error flag, the scenario mid-score is "insufficient credit," and the text label output is "Low-score Risk." Next, if there are no unscorables, then the scenario mid-score is the lowest scenario score, and the text label output is "Low-score Risk." Next, if there is one unscorable, the scenario mid-score is the only scenario score, and the text label output is "Low-score Risk." Next, if there are two unscorables, then the scenario mid-score is "N/A," and the text label output is "Low-score Risk." Further, in case of a tie in the scenario scores (excluding unscorables), the scenario mid-score is repeated scores, and the text label output is "Low-score Risk." Last, if on any bureau the current score is scorable but the software was unable to return a forecast, then the scenario mid-score is "insufficient data," and the text label output is "Low-score Risk."

Third, if there is one valid original credit score, then the scenario mid-score is calculated as follows. If the profile has the error flag, then the scenario mid-score is "insufficient credit," and the text label output is "Score Risk." Next, if there are no unscorables, the scenario mid-score is the lone scenario score, and the text label output is "Score Risk." Next, if there is one unscorable, then the scenario mid-score is "N/A," and the text label output is "Score Risk." Last, if on any bureau the current score is scorable but the software was unable to return a forecast, then the scenario mid-score is "insufficient data," and the text label output is "Score Risk."

Fourth, if there are NO valid original credit scores, then the scenario mid-score is "N/A," and the text label output is 'Score Risk'

In order to calculate the scenario mid-score that is output for presentation in the summary report 314, the following process is employed. If the scenario mid-score is "insufficient data," the system outputs "insufficient data." If the scenario mid-score is "insufficient credit," the system outputs "insufficient credit." If the scenario mid-score is "N/A," the system outputs N/A. If the scenario mid-score is less than the mid-score, the system outputs the scenario mid-score and outputs the DOWN arrow indicator. Last, if the scenario mid-score is greater than or equal to the mid-score, the system outputs "no decrease" and outputs the NEUTRAL arrow indicator.

As mentioned above, the summary document creation engine outputs a flag for the host's developer to determine whether to show the "Change amount" button 114 reflected in FIGS. 1 and 2. Preferably, the "Change Amount" button indicator is always set to YES (such that the host's developer must display this button), unless the mid-score risk scores from both scenarios are "insufficient data."

For the scenario to age/increase revolving balances by $X, the summary document creation engine 310 first creates a projected raw credit file for each bureau and applicant and scores it to obtain the forecasted score. The projected raw credit profile incorporates the following assumptions: (i) only revolving accounts that have been updated within the last three months can have their balances increased; (ii) apply the balance to revolving accounts according to a sort order of accounts from smallest to largest available credit, in order to maximize the potential score impact; (iii) only accounts that have been updated within the last three months are aged; (iv) all dates that change monthly are advanced by one month; (v) installment loan balances are reduced by the principal amount of their monthly payments, unless the account is in a terminal derogatory status; (vi) revolving and charge card balances not increased by the scenario remain the same; (vii) payment statuses remain the same on all accounts; and (viii) negative information is removed according to FCRA time limits, if needed.

Next, at step 424, the summary document creation engine 310 outputs certain key indicators 120, the particular selection of which are based on selections made by the hosting partner computers. Labels 122 for indicators identify the indicators that the end-users should pay particular attention to in the credit reports. The summary document creation engine 310 produces indicator flags based on the information provided by the hosts from the consumer applicant's merged credit file, and provides information about the presence of a key indicator 120 on the credit report. Likewise, the indicators themselves comprise summary information based on the information provided by the hosts (from the merged credit report) to draw attention of the end-user to specific portions of the credit report.

The following key indicators 120 are preferably presented by the summary document creation engine 310 and available for the hosting partner computer to incorporate: (i) negative mortgage history over the last 12 months; (ii) negative mortgage history for all time; (iii) installment loans that have no more than 10 months left; (iv) collections accounts; (v) public records entries on the consumer applicant's credit report; (vi) accounts in dispute; (vii) accounts in credit counseling; (viii) authorized user accounts; (ix) mortgage shopping indications (recent inquiries); and (x) alerts reported by bureaus. Each indicator 120 can have the value of Yes, No, or "not checked." If any field is missing or invalid, the engine will output "not checked." Otherwise, for each valid field, the engine will output a flag that informs the host's developer to show either the presence of a particular piece of information or absence of that information.

Finally, at step 424, an electronic summary document 314 is generated presenting the above outputs in a single page, electronic, summary document to a user of mortgage originator computer 330.

While much of the above description of the system and method of the invention are directed to scenarios comprising co-applicants, when only a single applicant is run through the system and method described herein, then a special value may be output so the host's developers know that only a single applicant was run. In that output, preferably only this special value of the text is shown in place of the standard content for the co-applicant.

Figure 5:
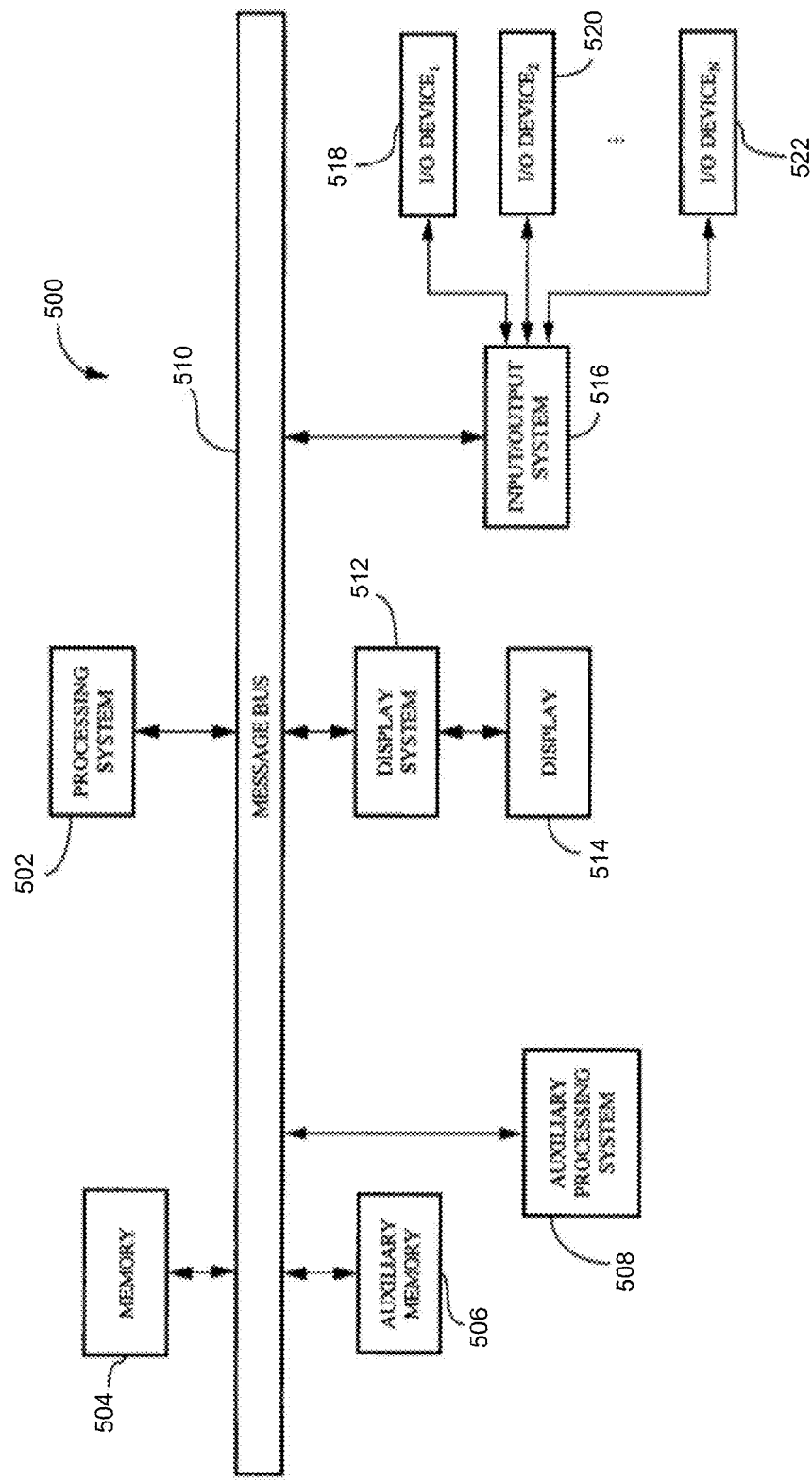
FIG. 5 is a schematic representation of exemplary hardware suitable for use with the system of FIG. 3.

Summary document creation engine 310 may be hosted on one or more server computers configured to communicate with client and other interconnected computing devices using TCP/IP packets. An exemplary hardware system generally representative of a computing device suitable for such uses, and for hosting computer 340, credit reporting agency computers 320, and mortgage originator computers 330, is shown in FIG. 5. In each case, a central processing system 502 controls the hardware system 500 of the summary document creation engine 310. A central processing unit such as a microprocessor or microcontroller for executing programs is included in the central processing system 502 for the performance of data manipulations and controlling the tasks of the hardware system 500. A system bus 510 provides the communication with the central processor 502 for transferring information among the components of the hardware system 500. Facilitating information transfer between storage and other peripheral components of the hardware system may be a data channel that may be included in bus 510. Further, the set of signals required for communication with the central processing system 502 including a data bus, address bus, and control bus is provided by bus 510. It is contemplated that any state of the art bus architecture according to promulgated standards may be utilized for bus 510, for example industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and so on.

A main memory 504 and auxiliary memory 506 (including an auxiliary processing system 508, as required) may be provided. The storage of instructions and data for programs executing on the central processing system 502 is provided by main memory 504. Typically semiconductor-based memory such as dynamic random access memory (DRAM) and/or static random access memory (SRAM) is used for the main memory 504. However, main memory 504 may utilize other semi-conductor-based memory types, such as synchronous dynamic random access memory (SDRAM), Rambus dynamic random access memory (RDRAM), ferroelectric random access memory (FRAM), and so on. The storage of instructions and data that are loaded into the main memory 504 before execution is provided by auxiliary memory 506. The storage capabilities provided by the auxiliary memory 506 may include semiconductor based memory such as read-only memory (ROM), programmable read-only memory (PROM), erasable programmable read-only memory (EPROM), electrically erasable read-only memory (EEPROM), or flash memory (block oriented memory similar to EEPROM). Alternatively, a variety of non-semiconductor-based memories, including but not limited to floppy disk, hard disk, magnetic tape, drum, optical, laser disk, compact disc read-only memory (CD-ROM), write once compact disc (CD-R), rewritable compact disc (CD-RW), digital versatile disc read-only memory (DVD-ROM), write once DVD (DVD-R), rewritable digital versatile disc (DVD-RAM), and other varieties of memory devices as contemplated may be used for auxiliary memory 506.

Auxiliary processors of the auxiliary processing system 508, which are discrete or built into the main processor, may be included in hardware system 500. These auxiliary processors may be used as a digital signal processor (a special-purpose microprocessor having an architecture suitable for fast execution of signal processing algorithms), as a back-end processor (a slave processor subordinate to the main processing system), as an additional microprocessor or controller for dual or multiple processor systems, or as a coprocessor. They may also be used to manage input/output and/or to perform floating point mathematical operations.

A display system 512 for connecting to a display device 514, wherein the display system 512 may comprise a video display adapter having all of the components for driving the display device, including video memory, buffer, and graphics engine as desired, is included in hardware system 500. Video memory may be, for example, windows random access memory (WRAM), video random access memory (VRAM), synchronous graphics random access memory (SGRAM), and the like. The display device 514 may comprise a cathode ray-tube (CRT) type display such as a monitor or television, or an alternative type of display technology such as a projection-type CRT display, a light-emitting diode (LED) display, a gas or plasma display, an electroluminescent display, a vacuum fluorescent display, a cathodoluminescent (field emission) display, a liquid-crystal display (LCD) overhead projector display, an LCD display, a plasma-addressed liquid crystal (PALC) display, a high gain emissive display (HGED), and so forth.

An input/output (I/O) system 516 for connecting to one or more I/O devices 518, 520, and up to N number of I/O devices 522 is included in hardware system 500. Interface functions between the one or more I/O devices 518-522 may be provided by various controllers or adapters. I/O devices such as a keyboard, mouse, trackball, touchpad, joystick, trackstick, infrared transducers, printer, modem, RF modem, bar code reader, charge-coupled device (CCD) reader, scanner, compact disc read-only memory (CD-ROM), digital versatile disc (DVD), video capture device, touch screen, stylus, electroacoustic transducer, microphone, speaker, and others may be communicatively coupled by various interface mechanisms, such as universal serial bus (USB) port, universal asynchronous receiver-transmitter (UART) port, serial port, IEEE 1394 serial bus port, infrared port, network adapter, parallel port, printer adapter, radio-frequency (RF) communications adapter, and others. Analog or digital communication capabilities between the hardware system 500 and the input/output system 516 and I/O devices 518-522 may be provided for communication with external devices, networks, or information sources. Preferably industry promulgated architecture standards are implemented by system 516 and I/O devices 518-522, including Ethernet IEEE 802 standards (e.g., IEEE 802.3 for broadband and baseband networks, IEEE 802.3z for Gigabit Ethernet, IEEE 802.4 for token passing bus networks, IEEE 802.5 for token ring networks, IEEE 802.6 for metropolitan area networks, and so on), Fibre Channel, digital subscriber line (DSL), asymmetric digital subscriber line (ASDL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on. It is to be understood that modification or reconfiguration of the hardware system 500 of FIG. 3 by one having ordinary skill in the art would not depart from the scope or the spirit of the present invention.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It should be understood, therefore, that the invention may be practiced otherwise than as specifically set forth herein.

We claim:

1. A computer implemented method for the automated generation and display of an electronic, single-page summary report aggregating key data from a consumer's multiple electronic credit reports, comprising the steps of:
   causing a summary document creation server computer executing a summary document creation engine to receive a consumer's credit report data from each of a plurality of credit bureaus;
   identifying at said summary document creation server computer the consumer's current credit scores from said credit report data;
   determining at said summary document creation server computer a score type for each of said current credit scores;
   determining at said summary document creation server computer whether a mid-score flag is to be assigned to a single one of the current credit scores;
   assigning at said summary document creation server computer a mid-score type label to a mid-score flag that has been assigned;
   determining at said summary document creation server computer a forecasted mid-score for said consumer 30 days in the future;
   determining at said summary document creation server computer a projected mid-score for said consumer resulting from a hypothetical increase in an amount of said consumer's revolving debt;
   determining at said summary document creation server computer whether a key indicator flag is to be assigned to each of a plurality of key indicators, wherein presence of a key indicator flag is indicative of the presence of negative credit report information associated with a key indicator in said consumer's credit report;
   combining at said summary document creation server computer said current credit scores, an indicator of said mid-score type label, said forecasted mid-score, said projected mid-score, and key indicators for which key indicator flags have been assigned into a single electronic form summary document; and
   transmitting said single electronic form summary document to a third party computer.

2. The method of claim 1, further comprising the step of displaying an arrow including said mid-score type label adjacent said single one of the current credit scores.

3. The method of claim 1, wherein said step of determining at said summary document creation server computer a forecasted mid-score for said consumer 30 days in the future further comprises aging said consumer's credit report data by 30 days.

4. The method of claim 3, further comprising the step of displaying an up arrow indicative of a forecasted mid-score that is higher than said consumer's current mid-score.

5. The method of claim 3, further comprising the step of displaying a down arrow indicative of a forecasted mid-score that is lower than said consumer's current mid-score.

6. The method of claim 1, wherein said step of determining at said summary document creation server computer a projected mid-score for said consumer resulting from a hypothetical increase in an amount of said consumer's revolving debt further comprises the steps of determining a first projected mid-score corresponding to an increase in said consumer's revolving credit by a first amount, and determining a second projected mid-score corresponding to an increase in said consumer's revolving credit by a second amount.

7. The method of claim 6, further comprising the step of displaying both of said first and second projected mid-scores.

8. The method of claim 7, further comprising displaying a down arrow adjacent at least one of said projected mid-scores that is lower than said consumer's current mid-score.

9. The method of claim 1, wherein said key indicators are selected from the group consisting of collection accounts, accounts noted in public records, accounts in dispute, accounts in credit counseling, authorized user accounts, mortgage shopping by the consumer, and alerts reported by credit bureaus.

10. A system for the automated generation and display of an electronic, single-page summary report aggregating key data from a consumer's multiple electronic credit reports, comprising:
   a summary document creation server computer having executable computer code stored thereon executing a summary document creation engine adapted to:
      receive a consumer's credit report data from each of a plurality of credit bureaus;
      identify the consumer's current credit scores from said credit report data;
      determine a score type for each of said current credit scores;
      determine whether a mid-score flag is to be assigned to a single one of the current credit scores;
      assign a mid-score type label to a mid-score flag that has been assigned;
      determine a forecasted mid-score for said consumer 30 days in the future;
      determine a projected mid-score for said consumer resulting from a hypothetical increase in an amount of said consumer's revolving debt;
      determine whether a key indicator flag is to be assigned to each of a plurality of key indicators, wherein presence of a key indicator flag is indicative of the presence of negative credit report information associated with a key indicator in said consumer's credit report;
      combine said current credit scores, an indicator of said mid-score type label, said forecasted mid-score, said projected mid-score, and key indicators for which key indicator flags have been assigned into a single electronic form summary document; and transmit said single electronic form summary document to a third party computer.

11. The system of claim 10, wherein said executable computer code is further adapted to display an arrow including said mid-score type label adjacent said single one of the current credit scores.

12. The system of claim 10, wherein determining a forecasted mid-score for said consumer 30 days in the future further comprises aging said consumer's credit report data by 30 days.

13. The system of claim 12, wherein said executable computer code is further adapted to display an up arrow indicative of a forecasted mid-score that is higher than said consumer's current mid-score.

14. The system of claim 12, wherein said executable computer code is further adapted to display a down arrow indicative of a forecasted mid-score that is lower than said consumer's current mid-score.

15. The system of claim 10, wherein determining a projected mid-score for said consumer resulting from a hypothetical increase in an amount of said consumer's revolving debt further comprises determining a first projected mid-score corresponding to an increase in said consumer's revolving credit by a first amount, and determining a second projected mid-score corresponding to an increase in said consumer's revolving credit by a second amount.

16. The system of claim 15, wherein said executable computer code is further adapted to display both of said first and second projected mid-scores.

17. The system of claim 16, wherein said executable computer code is further adapted to display a down arrow adjacent at least one of said projected mid-scores that is lower than said consumer's current mid-score.

18. The system of claim 10, wherein said key indicators are selected from the group consisting of collection accounts, accounts noted in public records, accounts in dispute, accounts in credit counseling, authorized user accounts, mortgage shopping by the consumer, and alerts reported by credit bureaus.

* * * * *